US008314761B2

(12) United States Patent
Takada et al.

(10) Patent No.: US 8,314,761 B2
(45) Date of Patent: Nov. 20, 2012

(54) DISPLAY DEVICE

(75) Inventors: Naoki Takada, Yokohama (JP); Yasuyuki Kudo, Fujisawa (JP); Yoshiki Kurokawa, Tokyo (JP); Norio Mamba, Kawasaki (JP); Shinichi Komura, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 13/524,099

(22) Filed: Jun. 15, 2012

(65) Prior Publication Data

US 2012/0249613 A1 Oct. 4, 2012

Related U.S. Application Data

(63) Continuation of application No. 12/353,314, filed on Jan. 14, 2009, now Pat. No. 8,232,944.

(30) Foreign Application Priority Data

Feb. 15, 2008 (JP) ................................ 2008-034224

(51) Int. Cl.

| | |
|---|---|
| ***G09G 5/02*** | (2006.01) |
| ***G09G 3/36*** | (2006.01) |
| ***G09G 5/10*** | (2006.01) |
| ***G06F 15/00*** | (2006.01) |

(52) U.S. Cl. ............ 345/88; 345/690; 345/589; 358/1.9

(58) Field of Classification Search .............. 345/76–81, 345/87–90, 589–604
See application file for complete search history.

(56) References Cited

U.S. PATENT DOCUMENTS

| | | | | |
|---|---|---|---|---|
| 7,221,381 | B2 * | 5/2007 | Brown Elliott et al. | 345/690 |
| 2005/0219274 | A1 * | 10/2005 | Yang et al. | 345/690 |
| 2006/0146351 | A1 * | 7/2006 | Lo et al. | 358/1.9 |
| 2007/0139326 | A1 * | 6/2007 | Kwon | 345/88 |

* cited by examiner

*Primary Examiner* — Alexander Eisen
*Assistant Examiner* — Amit Chatly
(74) *Attorney, Agent, or Firm* — Antonelli, Terry, Stout & Kraus, LLP.

(57) ABSTRACT

A processing portion for conversion from RGB to RGBW includes a W generating circuit, a sub-pixel rendering circuit, a W intensity calculating portion which transmits a W intensity setting value to a W generating circuit, and a low power backlight control circuit which expands data on the basis of the RGBW pixels generated by the sub-pixel rendering portion and lowers the backlight in accordance with the amount by which the data is expanded. The inputted RGB data is used as the RGBW data with the W intensity calculated by the W intensity calculating portion. A backlight control signal is generated based on the amount of data expansion in the sub-pixel rendering portion. Deterioration (darkness) of image quality due to a reduction in the brightness of a single color as a result of the conversion from RGB pixels to RGBW pixels is prevented and a reduction in the power is achieved.

14 Claims, 17 Drawing Sheets

| expanded display data | selection data value | backlight control signal(brightness ratio) | |
|---|---|---|---|
| 100% | 255 | 255 | (100%) |
| 104% | 245 | 234 | (96%) |
| 108% | 235 | 213 | (92%) |
| : | : | : | |
| 120% | 204 | 156 | (80%) |
| 124% | 194 | 140 | (76%) |
| 130% | 179 | 117 | (70%) |

| expanded display data | selection data value | backlight control signal (brightness ratio) | |
|---|---|---|---|
| 100% | 255 | 255 | (100%) |
| 104% | 245 | 234 | (96%) |
| 108% | 235 | 213 | (92%) |
| : | : | : | |
| 120% | 204 | 156 | (80%) |
| 124% | 194 | 140 | (76%) |
| 130% | 179 | 117 | (70%) |

DISPLAY DEVICE

CROSS-REFERENCE TO RELATED APPLICATION

This application is a continuation of U.S. application Ser. No. 12/353,314, filed Jan. 14, 2009 now U.S. Pat. No. 8,232,944, and which application claims priority from Japanese Patent Application 2008-034224, filed Feb. 15, 2008, and the entire contents of both are herein incorporated by reference.

BACKGROUND OF THE INVENTION

The present invention relates to a display device formed of an RGBW display panel module where an increase in brightness and a reduction in power consumption can be achieved, and which is improved upon with regards to a darkness in single colors, and in particular to a liquid crystal display device having a backlight.

The demand for middle- and small-sized displays having ultrahigh resolution, such as UMPC's, has tended to increase in recent years, and a reduction in the power in the system has become a significant issue. In this situation, RGBW pixel panels where white (W) sub-pixels (hereinafter referred to as W pixels) are added to conventional sub-pixels of red (R), green (G) and blue (B) (hereinafter referred to as RGB pixels) make it possible for the brightness to be increased, and therefore makes it possible to achieve a reduction in the power by reducing the scale of backlight, and thus it is considered that demand will increase in the future. Here, an RGB pixel means one color pixel formed of an R sub-pixel, a G sub-pixel and a B sub-pixel, and an RGBW pixel means one color pixel formed of an R sub-pixel, a G sub-pixel, a B sub-pixel and a W sub-pixel. One pixel is formed of a number of sub-pixels.

In RGBW pixel panels, though it is possible to increase the brightness by using W pixels, the brightness is low in the case where a single color is displayed without using W pixels. As a result, the brightness of a single color relative to white is low in the case where white and a single color are displayed, and thus a single color provides a dark image, and this is a factor in the deterioration of the image quality. Patent Document 1 (U.S. Pat. No. 7,221,381) can be cited as an example which discloses this type of prior art.

SUMMARY OF THE INVENTION

In the prior art, γ properties of liquid crystal display panels are taken into consideration so that the conversion from RGB to RGBW independent of the γ properties of the liquid crystal display panel is carried out. In the processing portion for this conversion from RGB to RGBW, the image is improved with regards to the darkness by changing the intensity of the W pixels. In the case where the white of RGB pixels=(255, 255, 255) is displayed on an RGBW panel according to the display with 256 grades (from 0 to 255 grades), for example, the brightness of the display of white is low in the case where RGB pixels are converted to RGBW pixels=(255, 255, 255, 0) in comparison with the case where RGB pixels are converted to RGBW pixels=(255, 255, 255, 255) through the process for conversion from RGB to RGBW. This means that the intensity of the W pixels is low.

Meanwhile, in the case where the yellow of RGB pixels=(255, 255, 0) is displayed on an RGBW panel, it is necessary for the W pixels to be of grade 0 in order to prevent the saturation from lowering. This is because a blue component transmits when W pixels are used, and therefore the yellow is tinged with blue. Therefore, it is necessary for the yellow to be RGBW pixels=(255, 255, 0, 0). In this case, the brightness does not change even when the intensity of the W pixels is lowered.

As described above, the brightness in the portions of the white display lowers when the intensity of the W pixels is lowered, while the brightness in the portions of a single-color or two-color display without using the W pixels, such as yellow, does not lower, and therefore the relative brightness of the white display portions to the yellow display portions becomes closer to that of the liquid crystal display panel formed of RGB stripes, and thus the panel is improved with regards to the darkness.

FIG. 16 is a diagram illustrating the configuration of a conventional processing portion for conversion from RGB to RGBW. This processing portion for conversion from RGB to RGBW 1201 is formed of a W generating circuit 1202 for generating W data and a sub-pixel rendering circuit 1203 for processing RGBW pixels for each sub-pixel. Here, the sub-pixel rendering process is briefly described. In the processing portion for conversion from RGB to RGBW 1201, one RGBW pixel is generated for two RGB pixels. Therefore, the amount of information of a high frequency component of the image is reduced. Thus, the information on the high frequency component in the reduced image data is newly generated from the original RGB image data, and a process is carried out on each sub-pixel of RGBW. This is referred to as a sub-pixel rendering process. In the case of a conventional circuit configuration, the intensity of W in the above described W generating circuit is set from the outside using an external setting means 1204. This setting is carried out by inputting a parameter into and holding the parameter in a register, not shown.

The processing portion for conversion from RGB to RGBW 1201 outputs the above described RGBW pixels from the sub-pixel rendering circuit 1203, and at the same time outputs a backlight control signal (BL control signal) from the W generating circuit 1202.

As described above, an external register setting is necessary for a parameter setting for the W intensity according to the prior art. That is to say, the setting of the W intensity does not change in accordance with data, and therefore in the case where the W intensity is set high, for example, the brightness of the image becomes high as a whole, while the relative brightness of the pixels using the W pixels to single color pixels becomes high, and therefore single color portions become relatively dark. In contrast, in the case where the W intensity is set low, the relative brightness of the pixels using the W pixels to the single color pixels becomes low while the brightness of the image becomes low as a whole.

An object of the present invention is to provide a display device where deterioration (darkness) of image quality due to a reduction in the brightness of a single color as a result of conversion from RGB pixels to RGBW pixels can be prevented and a reduction in the power can be achieved.

The display device according to the present invention is formed of an RGBW panel module provided with: a thin film transistor substrate having a number of data lines, a number of scanning lines which cross the data lines, and color pixels in a matrix where RGBW sub-pixels are placed at intersections between the above described data lines and the above described scanning lines; an RGBW liquid crystal display panel made of a color filter substrate having RGBW color filters corresponding to the above described RGBW sub-pixels; and a backlight module provided on the rear of the above described RGBW liquid crystal display panel which illuminates the RGBW liquid crystal display panel.

The present invention provides a display device having a scanning driver which applies a horizontal scanning signal to said scanning lines, a data driver which outputs grade voltages for the grades of the above described scanning lines to the above described data lines, and a CPU/MPU which transmits RGB data to the above described data driver, characterized in that the above described data driver has a circuit for conversion from RGB to RGBW which converts RGB data to RGBW data, the above described circuit for conversion from RGB to RGBW has a W intensity setting circuit which can change the ratio of the W intensity to the grade number of one RGB pixel, and the W intensity setting value for the above described W intensity setting circuit is determined in accordance with the ratio of the saturation pixel in the image data for each frame of a video signal.

According to the present invention, deterioration in the image quality (darkness) due to the lowering in the brightness of a single color as a result of the conversion from RGB pixels to RGBW pixels can be avoided and a reduction in the power can be achieved.

BRIEF DESCRIPTION OF THE DRAWINGS

These and other features, objects and advantages of the present invention will become more apparent from the following description when taken in conjunction with the accompanying drawings wherein.

DESCRIPTION OF THE EMBODIMENTS

Figure 1:
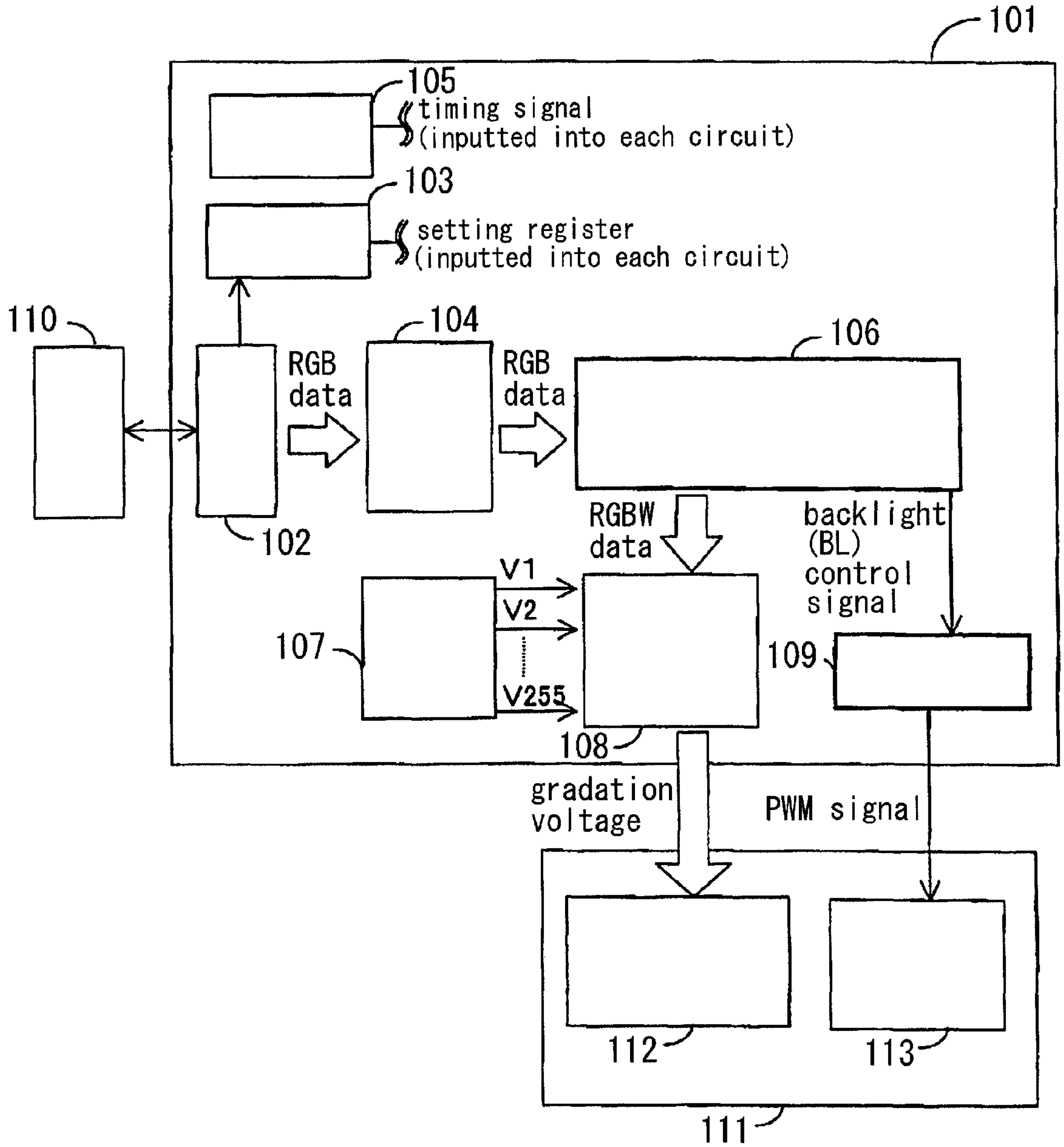
FIG. 1 is a diagram showing the configuration of the data driver in the liquid crystal display device according to the first embodiment of the present invention.

In the following, the best mode of the present invention is described in detail in reference to the drawings showing the embodiments.

Symbols used in the drawings showing the embodiments are: 101 . . . data driver, 102 . . . system IF, 103 . . . control register, 104 . . . graphic RAM, 105 . . . timing generating portion, 106 . . . processing section for conversion from RGB to RGBW, 201 . . . W generating circuit, 202 . . . sub-pixel rendering circuit, 203 . . . W intensity calculating portion, 204 . . . low power backlight control circuit, and 205 . . . W intensity setting value.

The display device according to the present invention is formed of an RGBW panel module provided with: a thin film transistor substrate having a number of data lines, a number of scanning lines which cross the data lines, and color pixels in a matrix where RGBW sub-pixels are placed at intersections between the above described data lines and the above described scanning lines; an RGBW liquid crystal display panel made of a color filter substrate having RGBW color filters corresponding to the above described RGBW sub-pixels; and a backlight module provided on the rear of the above described RGBW liquid crystal display panel which illuminates the RGBW liquid crystal display panel.

(First Embodiment)

Figure 2:
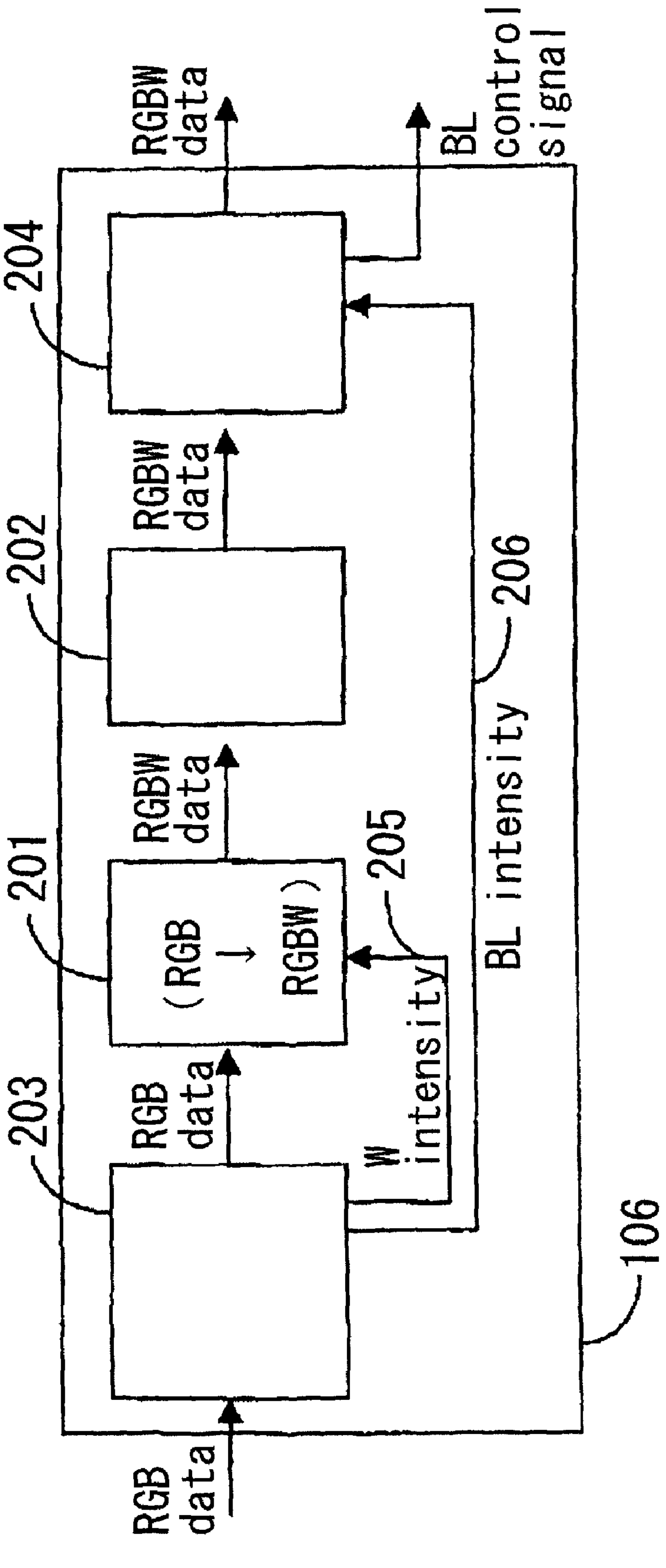
FIG. 2 is a diagram showing the configuration of a processing portion for conversion from RGB to RGBW in FIG. 1.
Figure 3A:
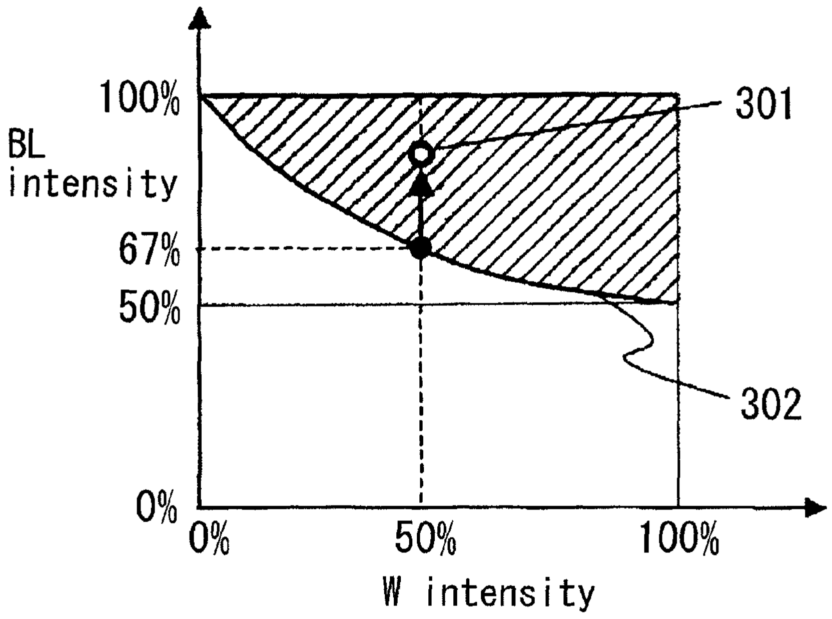
FIG. 3 is a graph for the explanation of a method for calculating the W strength in the W strength calculating circuit in FIG. 2.
Figure 3B:
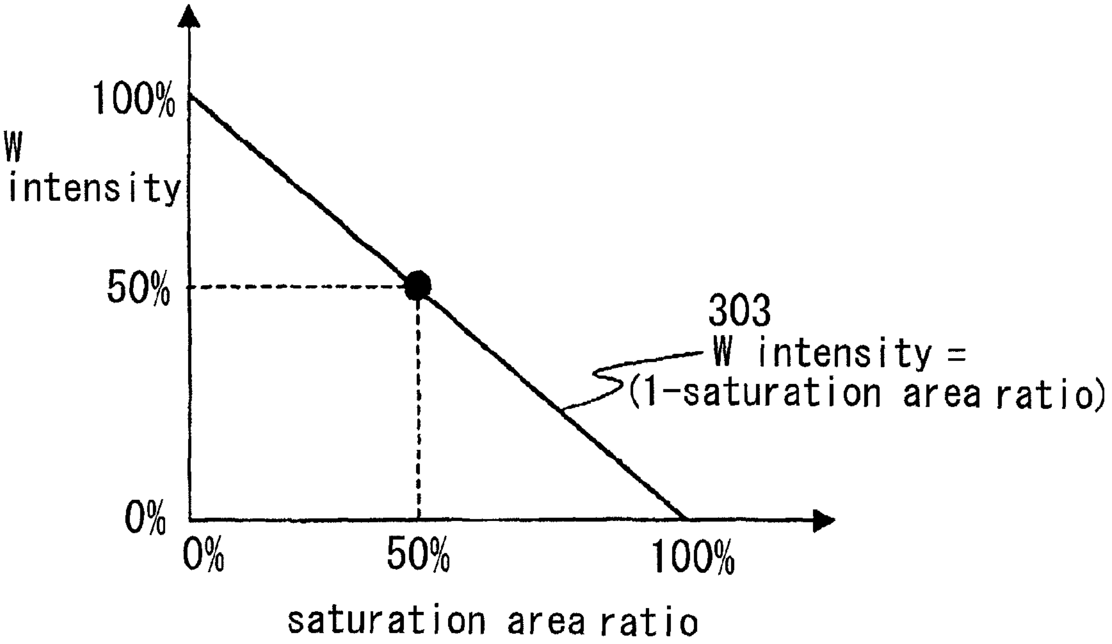
Figure 4:
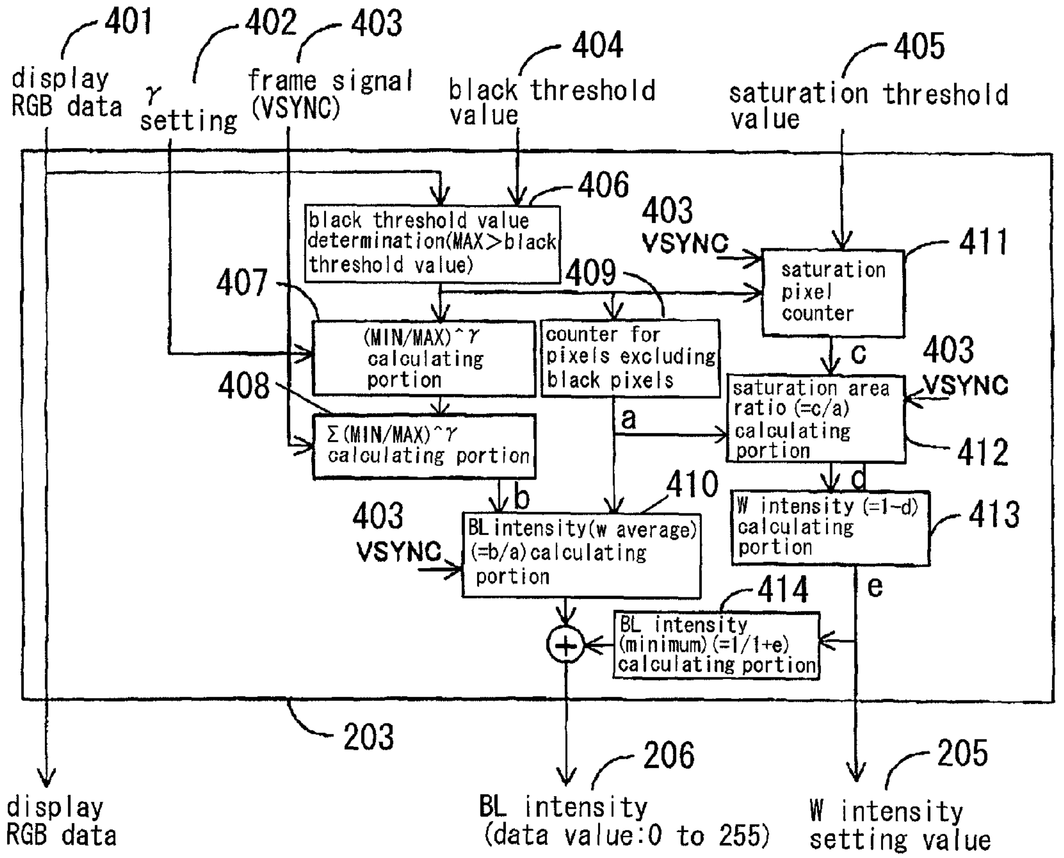
FIG. 4 is a diagram showing the configuration of the W intensity calculating circuit in FIG. 2.
Figure 5:
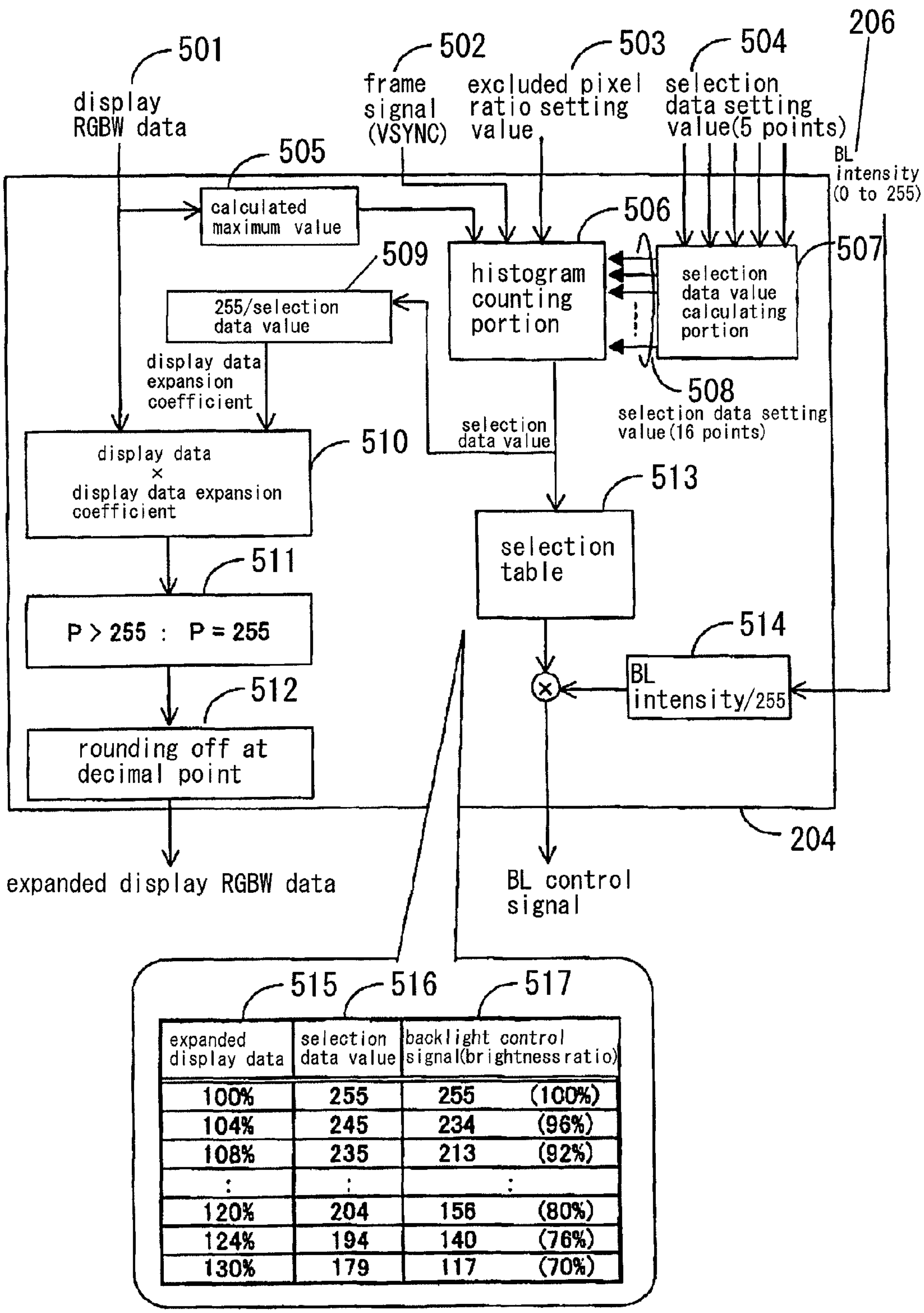
FIG. 5 is a diagram showing the detailed configuration of the low power backlight control circuit in FIG. 2.

The first embodiment of the present invention is described in reference to FIGS. 1 to 5. The first embodiment is characterized by setting the W (white) intensity and BL (backlight) brightness ratio in accordance with the ratio of the saturation pixels and the ratio of the W pixels in the image data (for example, the ratio of the numbers within the image in one frame). FIG. 1 is a diagram showing the configuration of the data driver in the liquid crystal display device according to the first embodiment of the present invention. FIG. 2 is a diagram showing the configuration of the processing portion for conversion from RGB to RGBW in FIG. 1. FIG. 3 is a graph for the explanation of a method for calculating the W intensity in the W intensity calculating circuit in FIG. 2. FIG. 4 is a diagram showing the configuration of the W intensity calculating circuit in FIG. 2. FIG. 5 is a diagram showing the detailed configuration of the low power backlight control circuit in FIG. 2. Saturation pixels are one color pixels tinged with red, green or blue and not white, grey or black in the case where one color pixels consist of RGB. The details are defined in the following.

The data driver 101 in FIG. 1 forms a processing portion for conversion from RGB to RGBW 106. FIG. 2 is a diagram showing the configuration of the processing portion for conversion from RGB to RGBW 106 which is formed of a conventional W generating circuit 201, a sub-pixel rendering circuit 202, a W intensity calculating portion 203 which transmits a W intensity setting value 205 to the W generating circuit 201, and a low power backlight control circuit 204 which expands data on the basis of the RGBW pixels generated in the sub-pixel rendering portion 202 so that the intensity of the backlight is lowered in accordance with the amount by which the data is expanded. In FIG. 1, the symbol 102 indicates a system IF, 103 indicates a control register, 104 indicates a graphic RAM, 105 indicates a timing generating portion, 107 indicates a grade voltage generating portion, 108 indicates a decoder, 109 indicates a PWM generating portion, 110 indicates a control processor, 111 indicates a panel module, 112 indicates an RGBW liquid crystal panel, and 113 indicates a backlight module. The functions of the respective circuits which form a conventional data driver are well-known, and the detailed description thereof is omitted. In the following, components which are particular to the present embodiment are described. The expansion of data means the conversion of each piece of data so that the distribution of the data expands in the direction of the lateral axis of the histogram of the data (the lateral axis indicates the value of data and the longitudinal axis indicates the frequency of the appearance of data).

FIG. 3 is a graph for the explanation of a method for calculating the W intensity in the above described W intensity calculating circuit, and FIG. 3(A) shows the relationship between the W intensity and the BL intensity. The hatched portion in FIG. 3(A) indicates the region in which the BL intensity corresponds with the W intensity. The greater the W intensity is, the wider the range in which the BL power corresponds is, that is to say, the lower the minimum value of the BL intensity is. In contrast, in the case where the W intensity is low, the range in which the BL power corresponds is narrowed, that is to say, the minimum value of the BL intensity becomes higher in the relationship. Here, BL intensity=BL intensity (minimum)+BL intensity (w average) 301. In this expression, the first term, BL intensity (minimum), can be represented by the W intensity and is in the relationship: BL intensity (minimum)=1/(1+W intensity) 302. Here, in accordance with the method for calculating the W intensity 303, as shown in FIG. 3(B), the W intensity 303 is determined in accordance with the saturation area ratio (number ratio, presence ratio) in the image data. The expression for calculating the saturation area ratio is Formula 1.

saturation area ratio=number of saturation pixels excluding black pixels (*1)/number of pixels excluding black pixels (*2) (Formula 1)

*1: total number of pixels of "saturation pixels=(sub-pixel MAX−sub-pixel MIN)>saturation threshold value" in "pixels excluding black pixels=sub-pixel MAX≦black threshold value"

*2: total number of pixels of "pixels excluding black pixels=sub-pixel MAX≦black threshold value"

Here, the black threshold value can take any of grades 0 to 255, and it is desirable for it to be approximately 30% or less in the case where the grade 255 is 100%. In addition, the saturation threshold value can take any of grades 0 to 255, and it is desirable for it to be approximately 50% to 100% in the case where the grade 255 is 100%. In addition, though the saturation is described as maximum pixel−minimum pixel, other indications for the saturation, for example, (maximum pixel−minimum pixel)/maximum pixel, may be used. In Formula 1, in the case where the ratio of the saturation is high, for example, the W intensity is low, and in the case where the ratio of the saturation is low, the W intensity is high.

Meanwhile, the BL intensity (w average) is a value indicating the average value of the white brightness in the image data, and the formula for calculating the above described BL intensity (w average) is as follows (Formula 2).

BL intensity (w average)=1−{Σ((sub-pixel MIN value/sub-pixel MAX value) excluding black pixels)γ (*3)/total number of pixels excluding black pixels (*4)} (Formula 2)

*3: pixels of "pixels excluding black pixels=sub-pixel MAX≦black threshold value," which have an added value of values of (sub-pixel MIN/sub-pixel MAX) to the power of γ value

*4: total number of pixels of "pixels excluding black pixels=sub-pixel MAX≦black threshold value"

Here, the black threshold value can take any of grades 0 to 255. In addition, the saturation threshold value can take any of grades 0 to 255. In the case where the average value of the white brightness is high, for example, the image data uses many W pixels, and therefore the image data has low saturation as a whole. In this case, it becomes possible to lower the BL power by setting the BL intensity (w average) low. In contrast, in the case where the average value of the white brightness is low, the image data has a low rate of W pixels used, and therefore the image data has high saturation as a whole. In this case, images having high saturation can be prevented from becoming relatively dark by setting the BL intensity (w average) high.

When the thus calculated BL intensity (MIN) and BL intensity (w average) are used, it becomes possible to prevent the quality of the images having high saturation from deteriorating due to relative darkness in comparison with the display portions using W pixels. In addition, in the case where images have low saturation, it becomes possible to lower the BL power, and thus it becomes possible to lower the power overall.

FIG. 4 is a diagram showing the detailed configuration of the W intensity calculating circuit in FIG. 2, which is a block diagram showing a means in which the method which is described in reference to FIG. 3 is used. In addition, FIG. 5 is a diagram showing the detailed configuration of the low power backlight control circuit 204 in FIG. 2, and shows a means into which the RGBW image outputted from the sub-pixel rendering circuit 202 in FIG. 2 and the BL intensity calculated from FIG. 4 are inputted and which carries out a backlight process.

The maximum grade within one pixel can be calculated from the RGBW data in FIG. 4 when the inputted RGBW data is for the pixel, and then a histogram for the image data for each frame is provided. The threshold value grade corresponding to the upper N % of RGBW (N % is a real number between 0% and 100%) is calculated from the above described histogram information. The value gained by dividing the maximum grade value that can be taken by the selected data, for example, grade 255 in the case of 8-bit data, by the above described threshold value grade is used as a data expansion coefficient, and the above described RGBW data is multiplied by the above described data expansion coefficient so that the data is expanded while a value gained as an inversion of the above described data expansion coefficient to the power of the γ value of the γ properties is calculated as a backlight brightness ratio, and thus a backlight brightness is determined through multiplication by the backlight brightness ratio on the basis of the W intensity setting value calculated as described above.

According to the present embodiment, the W intensity is lowered, and furthermore the backlight brightness is increased for images having high saturation, and thus the saturation and the brightness can be prevented from lowering when the backlight power increases. In this case, deterioration of the image quality (darkness) due to a reduction in the brightness of a single color, which is a problem with the RGBW pixels, can be prevented. In addition, the saturation is little affected in an image having low saturation when the W intensity is increased, and therefore the brightness increases by setting the W intensity high. In this case, it is possible to reduce the backlight brightness in order to achieve the same level of brightness as in the prior art, and therefore, a reduction in the power can be achieved.

(Second Embodiment)

Next, the second embodiment of the present invention is described in reference to FIGS. 1, 2 and 6 to 8. The second embodiment is characterized in that the W intensity and the BL intensity are set in the same manner as in the first embodiment, and in addition the relational equation between the saturation ratio and the W intensity in the image data for calculating the W intensity is independent from among computer graphic images, user interface images (CG/UI images) and natural images/moving images, and thus the relational expression between the saturation ratio and the W intensity in the above described image data is selected through the setting of the register.

Figure 6A:
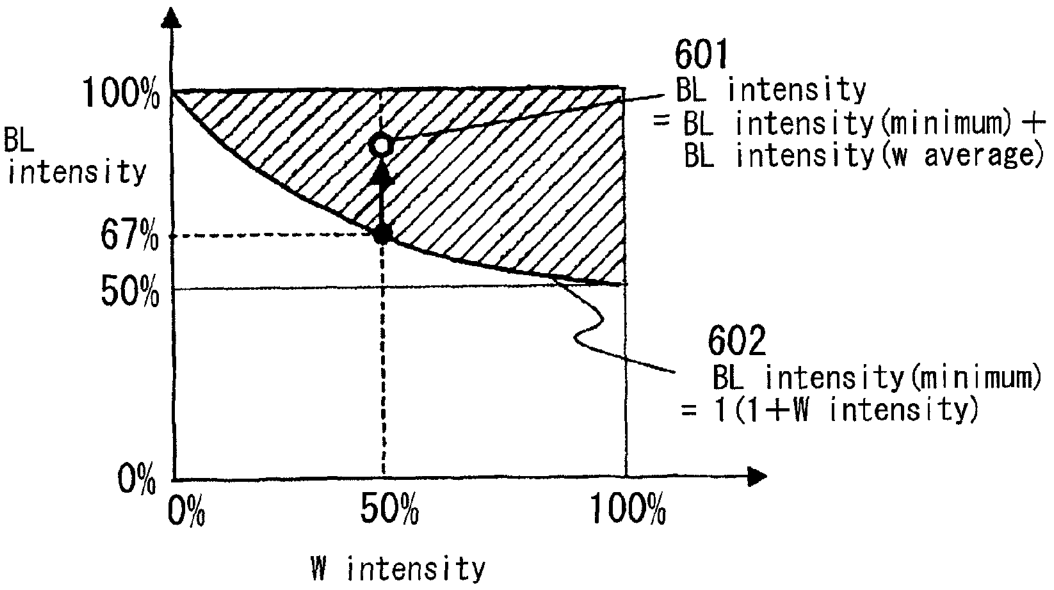
FIG. 6 is a graph for the explanation of the method for calculating the W intensity in the W intensity calculating portion in FIG. 2 according to the second embodiment.
Figure 6B:
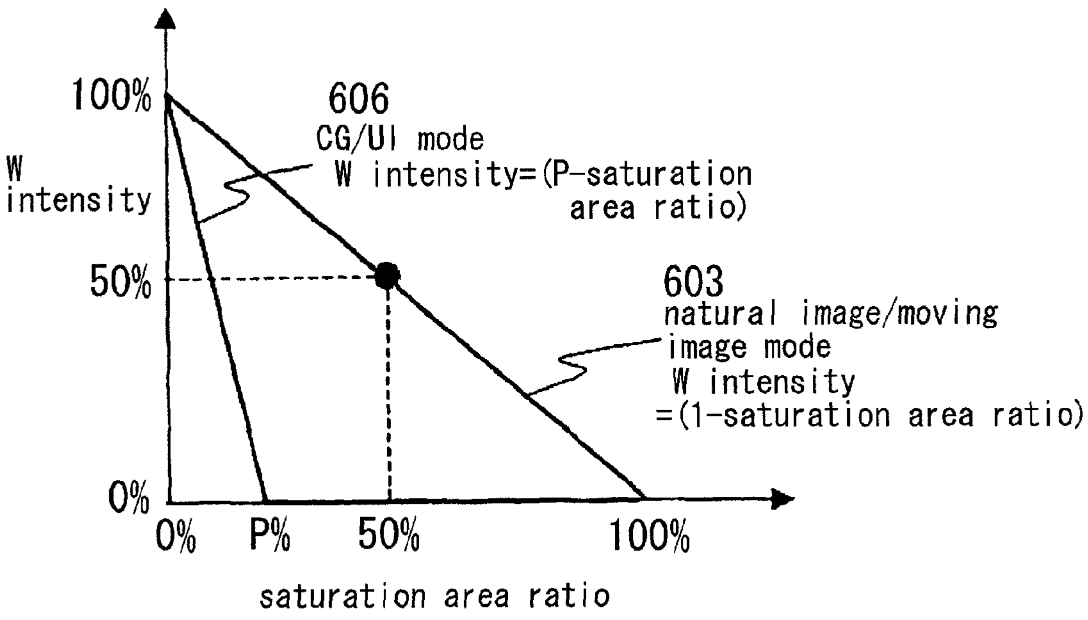

FIGS. 1 and 2 show the second embodiment in the same manner as in the first embodiment. FIG. 6 is a graph for the explanation of the method for calculating the W intensity in the W intensity calculating portion in FIG. 2 according to the second embodiment. FIG. 6(B) is different from FIG. 3(B) used for the explanation of the above described embodiment, but FIG. 6(A) is the same as FIG. 3(A). FIG. 6(B) shows the relationship between the W intensity and the saturation area ratio, and provides different relational expressions in the natural image/moving image mode 603 and in the CG/UI image mode 606. In the case of the CG/UI image mode 606, the W intensity becomes 0 at the point P (P is a real number of $0 \leqq P < 1$) along the lateral axis indicating the saturation area ratio of the figure. Accordingly, in the case of the CG/UI image, the W intensity is set low even when the saturation ratio is low.

Figure 7:
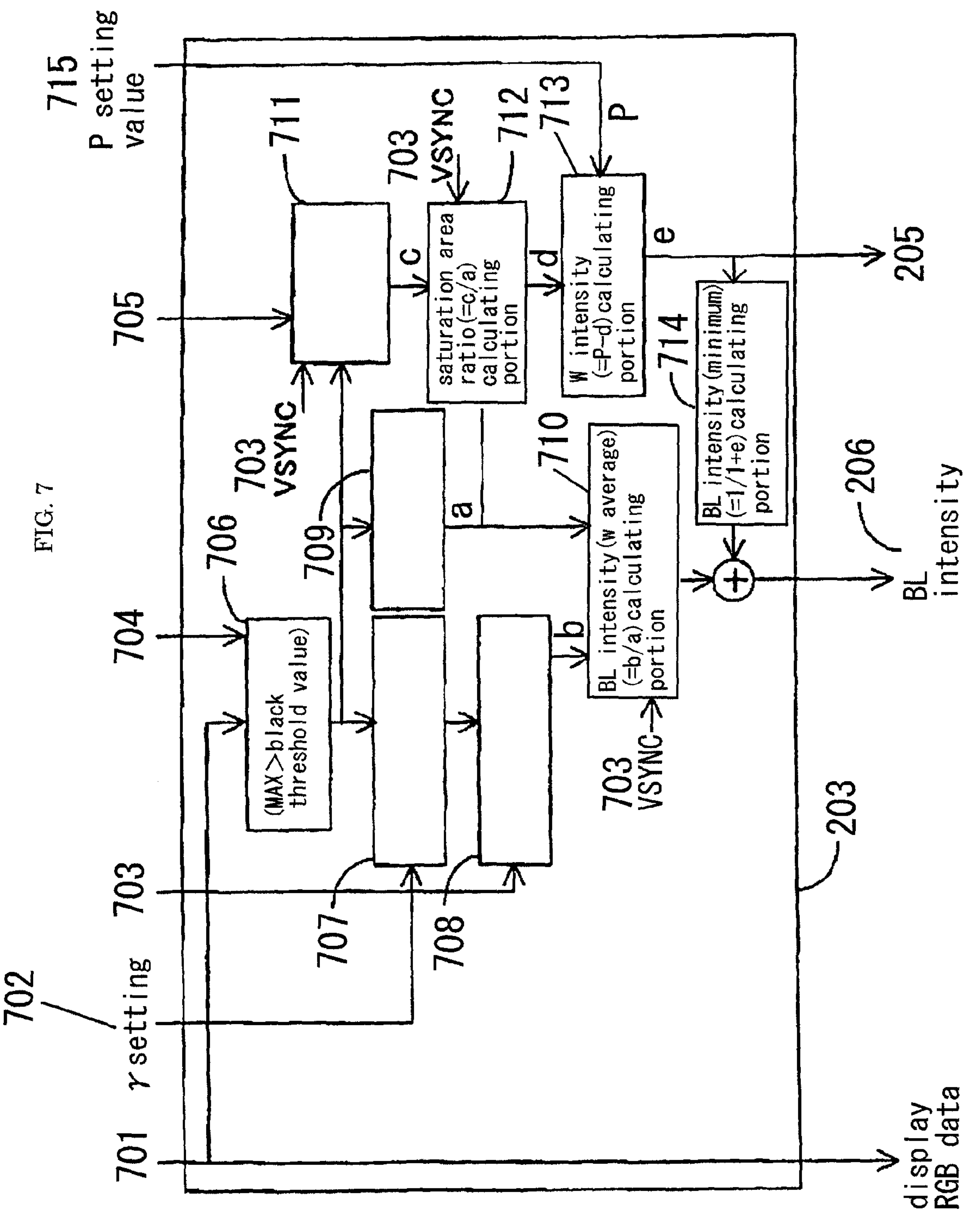
FIG. 7 is a diagram showing the configuration of the W intensity calculating portion in FIG. 2 according to the second embodiment.

FIG. 7 is a diagram showing the configuration of the W intensity calculating portion in FIG. 2 according to the second embodiment. FIG. 7 is a block diagram showing how the method in FIG. 6 is used. In FIG. 7, the W intensity calculating portion 203 is formed of a black threshold value determining portion 706 into which RGB data 701, which is display data, and a black threshold value 704 are inputted, a (MIN/MAX)γ calculating portion 707 into which a γ setting value is inputted, a Σ (MIN/MAX)γ calculating portion 708 into which a frame signal (VSYNC) 703 is inputted, a counter 709 which counts the number of pixels excluding black pixels, a BL intensity (w average) calculating portion 710, a saturation pixel counter 711 into which a saturation threshold value 705, a frame signal (VSYNC) 703 and a black threshold value determining portion 706 are inputted, a saturation area ratio calculating portion 712, a W intensity calculating portion 713 and a BL intensity (minimum) calculating portion 714.

Figure 8:
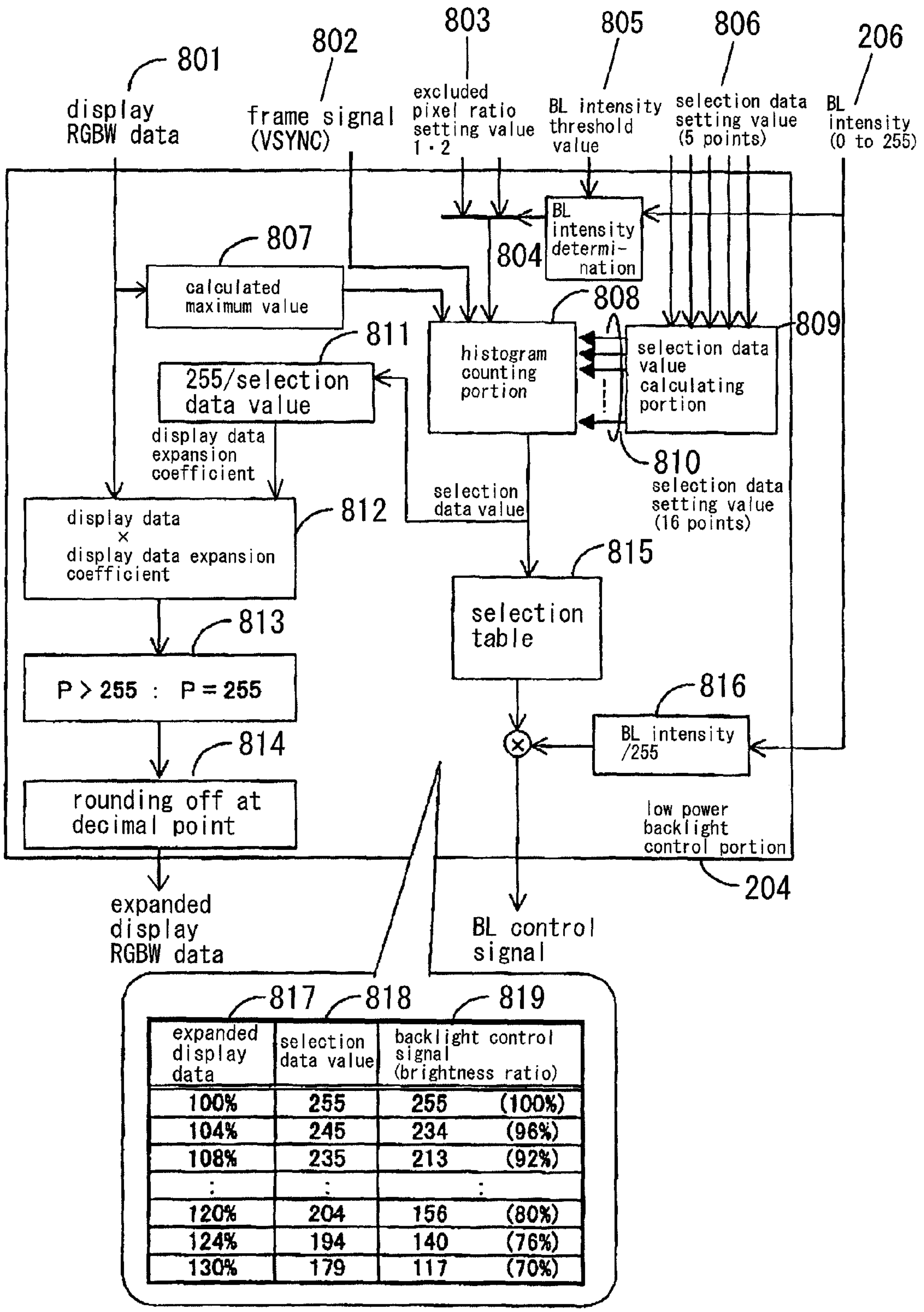
FIG. 8 is a diagram showing the configuration of the low power backlight control portion in FIG. 2 according to the second embodiment.

In addition, FIG. 8 is a diagram showing in the configuration of the low power backlight control portion of FIG. 2 according to the second embodiment. This low power backlight control portion 204 is formed of a maximum value calculating portion 807 into which RGBW data 801, which is display data, is inputted, a histogram counting portion 808 which receives the output of the maximum value calculating portion 807, a frame signal (VSYNC) 802, an excluded pixel ratio setting value 1·2 and the output of the BL intensity determining portion 804, a selected data value calculating portion 809 into which selected data setting points (five points) are inputted and which outputs a selected data setting value (16 points) 810 to the histogram counting portion 808, a 255/selected data value setting portion 811, a display data× display data expansion count calculating portion 812, an overflow data processing portion 813, a decimal point rounding down portion 814, a selection table 815 and a coefficient (BL intensity/255) calculating portion 816.

In FIG. 8, the expansion display data 813 is a block for processing overflow data, and as listed up in the table of FIG. 8, the grade is 255, the selected data value is 255 and the backlight control signal (brightness ratio) is 255 (100%) when this expansion display data 813 is 100%. In the case where the expansion display data 813 is 130%, the selected data value is 179 and the backlight control signal (brightness ratio) is 117 (70%).

According to the present embodiment as well, the W intensity is lowered, and furthermore the backlight brightness is increased in images having high saturation, and thus the saturation and the brightness can be prevented from lowering when the backlight power is increased, and the deterioration in the image quality (darkness) due to a reduction in the brightness of a single color, which is a problem with the RGBW pixels, can be prevented. In addition, the saturation is little affected in an image having low saturation when the W intensity is increased, and therefore the brightness increases by setting the W intensity high. In this case, it is possible to reduce the backlight brightness in order to achieve the same level of brightness as in the prior art, and therefore, a reduction in the power can be achieved.

(Third Embodiment)

Next, the third embodiment of the present invention is described in reference to FIGS. 1, 2, 6 and 9 to 11. The third embodiment has a relational expression between the saturation ratio and the W intensity independent in the CG/UI images and in the natural images/moving images, respectively, in the same manner as in the second embodiment, and in addition the above described two relational expressions are characterized by being determined when the image data automatically detects whether the image is characterized as a CG/UI image or as a natural image/moving image. FIGS. 1 and 2 show the third embodiment in the same manner as the first embodiment.

Figure 9A:
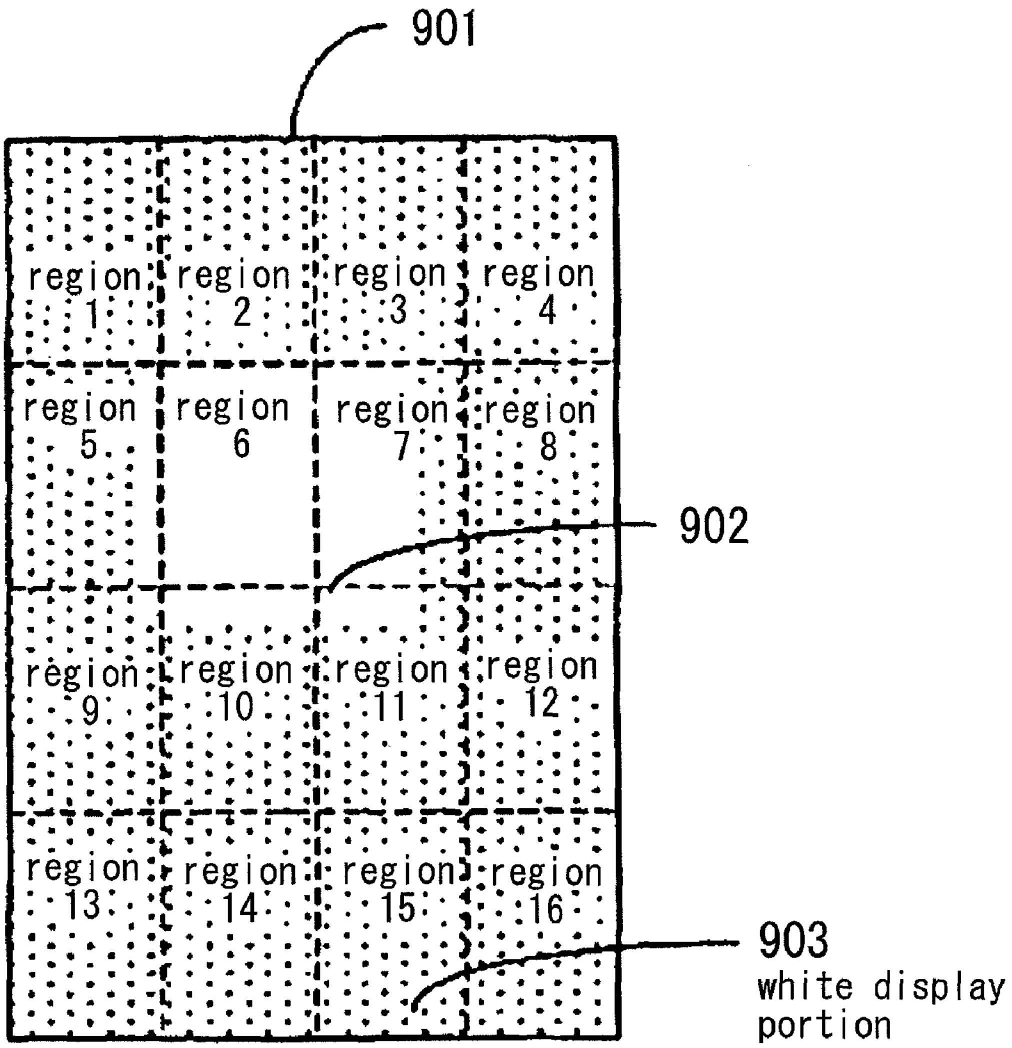
FIG. 9 is a diagram for the explanation of a method for determining whether the image is characteristic as a CG/UI image or a natural image/moving image from the relational expression between the saturation ratio and the W intensity in FIG. 6 according to the second embodiment.
Figure 9B:
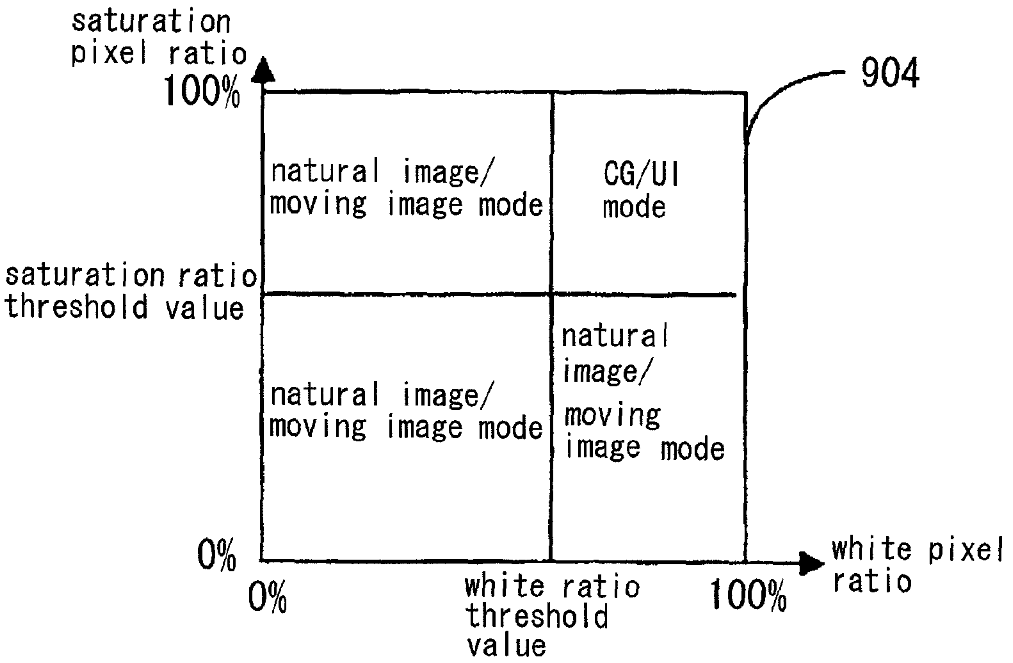

FIG. 9 is a graph for the explanation of a method for determining whether the image is characteristic as a CG/UI image or the image is characteristic as a natural image/moving image from the relational expression between the saturation ratio and the W intensity in FIG. 6 as described in the second embodiment. FIG. 9(A) shows an example in the case where the screen of the liquid crystal panel 901 is divided into 16 regions. The ratio of white pixels (here, a case where white pixels=R, G, B pixels have the white threshold value or higher, respectively, is shown) 903 for each region 1 to 16 and the ratio of saturation pixels (here, yellow BOX display portion 902) are accumulated (here, a case where white pixels=R, G, B pixels have the white threshold value or higher, respectively, is shown), and in the case where one or more of the divided regions satisfy the following conditions 1 and 2, a CG/UI mode is provided. FIG. 9(B) shows this relationship as the mode selecting conditions 904. In addition, the white threshold value under the following conditions is in a range from 0 to 255, and a range from 180 to 250 is desirable. In addition, the black threshold value under the following conditions is in a range from 0 to 255, and it is desirable for it to be 30 or less. In addition, the white ratio threshold value under the following conditions is in a range from 0% to 100%, and it is desirable for it to be set to 50%. In addition, the saturation ratio threshold value under the following conditions is in a range from 0% to 100%, and it is desirable for it to be set from 1% to 5%.

Condition 1: the number of white pixels within a region (here, number of pixels of "white pixels=each sub-pixel (R, G, B)≧white threshold value") is the set white ratio threshold value or higher relative to the number of pixels excluding black pixels within the region (here, pixels of "number of pixels excluding black pixels=maximum value of sub-pixels≧black threshold value").

Condition 2: the number of saturation pixels within a region (here, pixels of "saturation pixels=(sub-pixel MAX−sub-pixel MIN)≧saturation threshold value") is the set saturation ratio threshold value or higher relative to the number of pixels excluding black pixels within a region (here, pixels of "number of pixels excluding black pixels=maximum value of sub-pixels black≧threshold value").

Figure 9C:
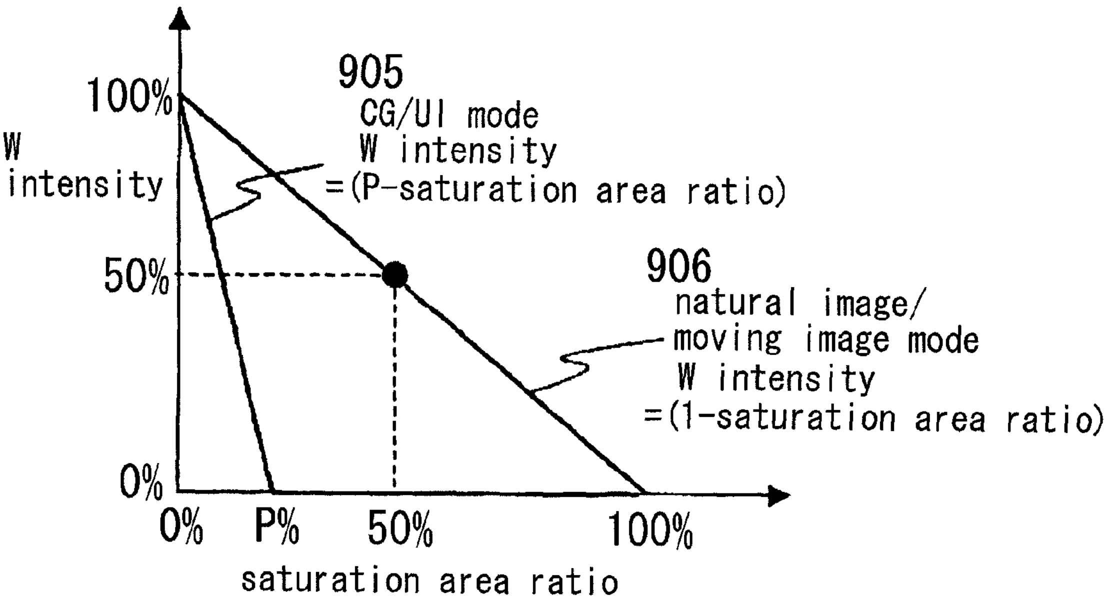

In the cases other than the above described two conditions, a natural image/moving image mode 906 is provided. FIG. 9(C) shows the relationship between the saturation area ratio and the W intensity in the above described two modes. In the case of a CG/UI image 905, there are many patterns, for example, letters having a high saturation against the white background. In this case, the ratio of saturation is set low when the white pixel ratio in the entire display data and the ratio of the saturation pixels are compared. When there are many white pixels against the background, however, darkness occurs frequently though there are only a few portions having high saturation. Accordingly, it becomes possible to save the above described pattern by dividing the image into regions so that saturation pixels are highlighted.

Figure 10:
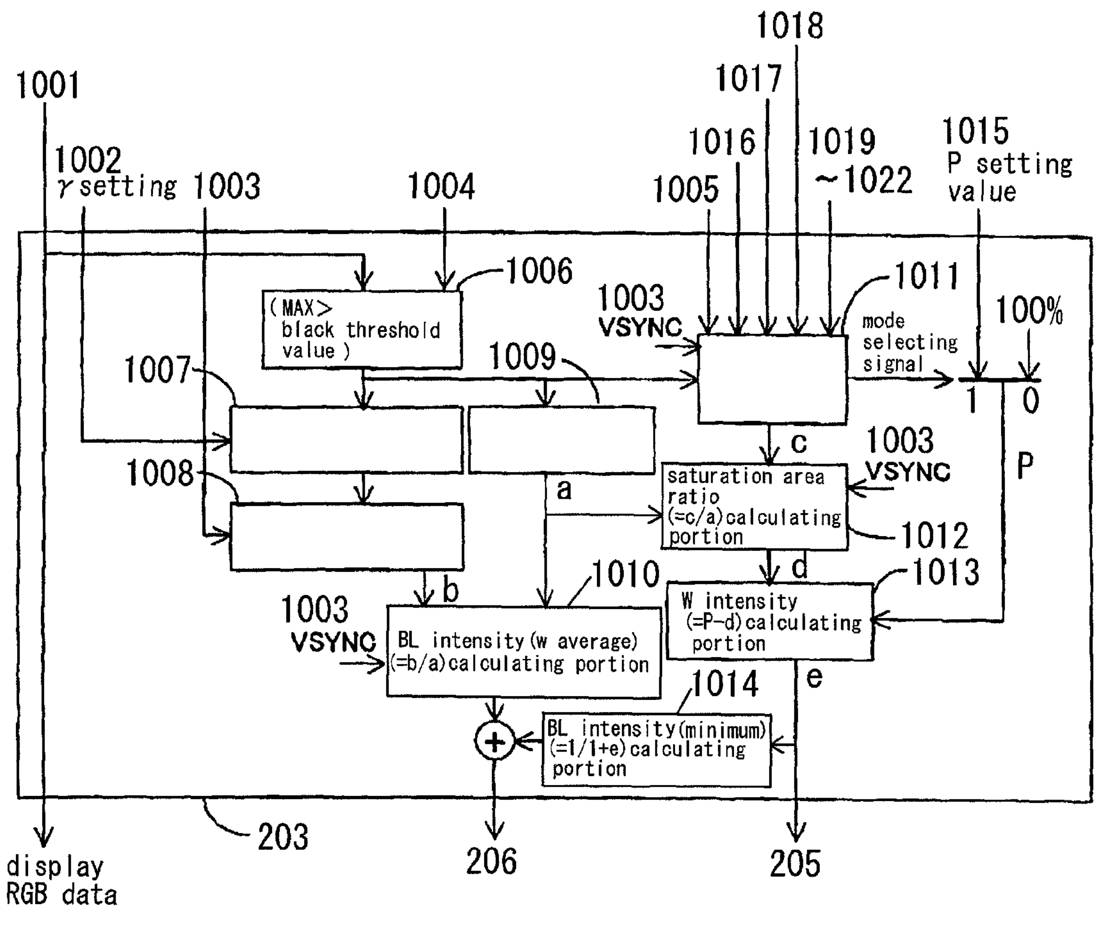
FIG. 10 is a diagram showing the configuration of the W intensity calculating portion according to the third embodiment.

Furthermore, FIG. 10 is a diagram showing the configuration of the W intensity calculating portion according to the third embodiment. The W intensity calculating portion 203 is formed of a black threshold value determining portion 1006 into which RGB data 1001, which is display data, and a black threshold value 1004 are inputted, a (MIN/MAX)γ calculating portion 1007 into which a γ setting value is inputted, a Σ (MIN/MAX)γ calculating portion 1008 into which a frame signal (VSYNC) 1003 is inputted, a counter 1009 which counts the number of pixels excluding black pixels, a BL intensity (w average) calculating portion 1110, a mold calculating portion 1011 into which a saturation threshold value 1005, a frame signal (VSYNC) 1003, a black threshold value determining portion 1006, a white threshold value 1016, a white pixel ratio threshold value 1017, a saturation pixel ratio threshold value 1018 and region selecting signals (1 to 4) 1019 to 1022 are inputted, a saturation area ratio calculating portion 1012, a W intensity calculating portion 1013 and a BL intensity (minimum) calculating portion 1014.

A BL intensity 206 and a W intensity setting value 205 can be gained from the configuration in FIG. 10. This BL intensity 206 becomes a control signal for a low power BL control portion, and the W intensity setting value 205 becomes a control signal during the W generation (conversion from RGB to RGBW).

Figure 11:
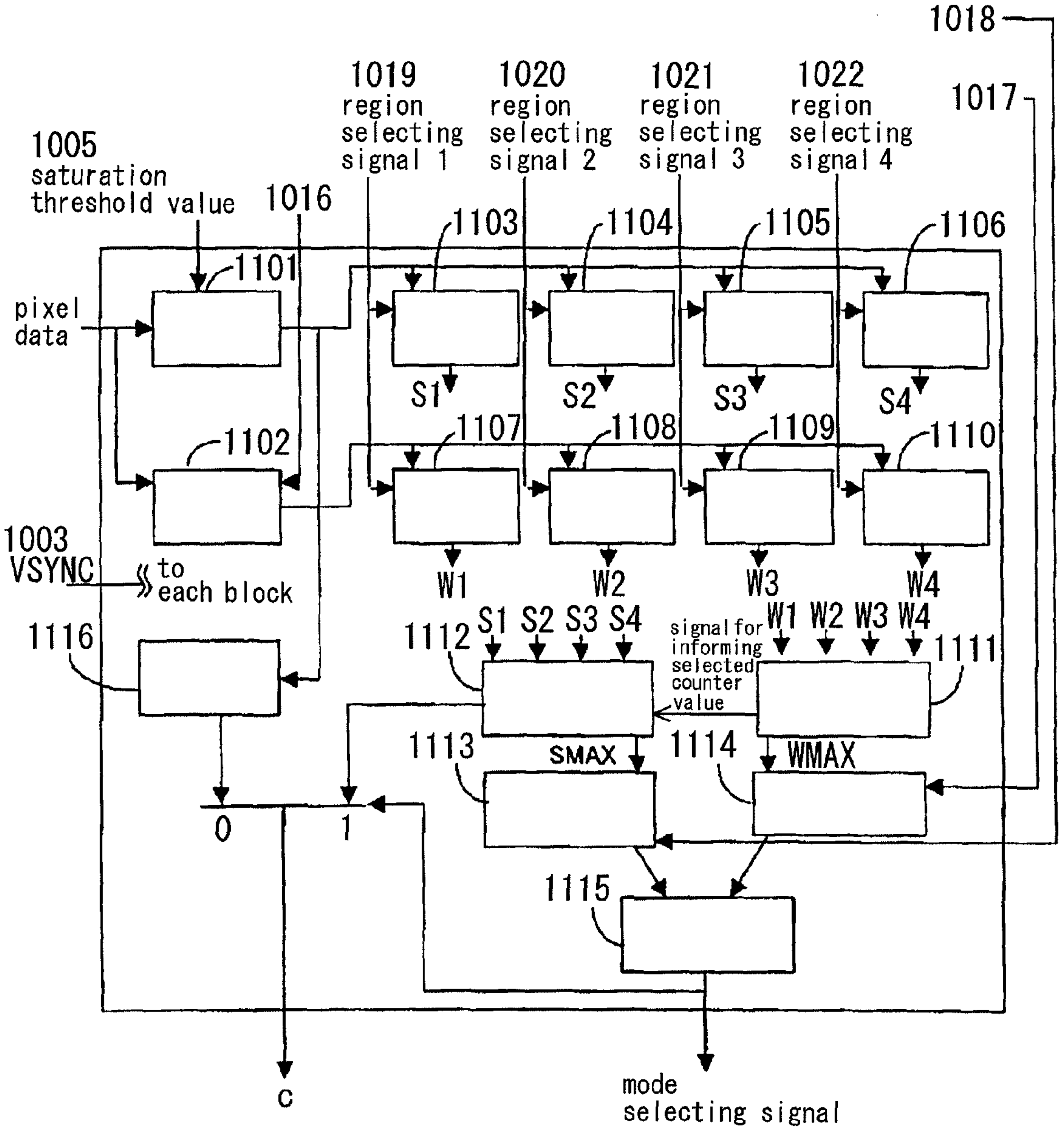
FIG. 11 is a diagram showing the circuit configuration of the mode calculating portion that forms the W intensity calculating portion according to the third embodiment.

FIG. 11 shows the circuit configuration of the mode calculating portion that forms the W intensity calculating portion according to the third embodiment. Here, FIG. 11 shows a case where the screen is divided into four regions in order to simplify the description. The mode calculating portion shown in FIG. 11 is formed of a saturation pixel determining portion 1101, a white pixel determining portion 1102, a saturation pixel counter (1) 1103, a saturation pixel counter (2) 1104, a saturation pixel counter (3) 1105, a saturation pixel counter (4) 1106, a white pixel counter (1) 1107, a white pixel counter (2) 1108, a white pixel counter (3) 1109, a white pixel counter (4) 1110, a white pixel maximum value selecting portion 1111, a saturation counter selecting value 1112, a saturation pixel ratio determining portion 1113, a white pixel ratio determining portion 1114, a CG/UI mode selection determining portion 1115 and a whole saturation pixel counter 1116.

A mode selecting signal and a c signal are gained from the configuration in FIG. 11. This c signal is inputted into a saturation area ratio (=c/a) calculating portion 1012 shown in FIG. 10 and used to calculate the saturation area.

According to the present embodiment as well, the W intensity is lowered, and furthermore the backlight brightness is increased in images having high saturation, and thus the saturation and the brightness can be prevented from lowering when the backlight power is increased, and the deterioration in the image quality (darkness) due to a reduction in the brightness of a single color, which is a problem with the RGBW pixels, can be prevented. In addition, the saturation is little affected in an image having low saturation when the W intensity is increased, and therefore the brightness increases by setting the W intensity high. In this case, it is possible to reduce the backlight brightness in order to achieve the same level of brightness as in the prior art, and therefore, a reduction in the power can be achieved.

(Fourth Embodiment)

Next, the fourth embodiment of the present invention is described in reference to FIGS. 1, 5 and 12 to 15. The fourth embodiment is characterized in that the W intensity is determined in accordance with the saturation histogram so that RGB pixels are converted to RGBW pixels in accordance with the above described W intensity, and thus the darkness in images which should theoretically have high saturation can be completely prevented. Furthermore, the embodiment is characterized in that a low power BL control is provided before the sub-pixel rendering processing portion, and thus the effects of increasing the precision of images gained in the sub-pixel rendering process (generation of a high frequency component of the reduced image data) are not lost. The configuration of the module as a whole in FIG. 1 and the low power backlight controlling portion in FIG. 5 are the same as in the first embodiment.

Figure 12:
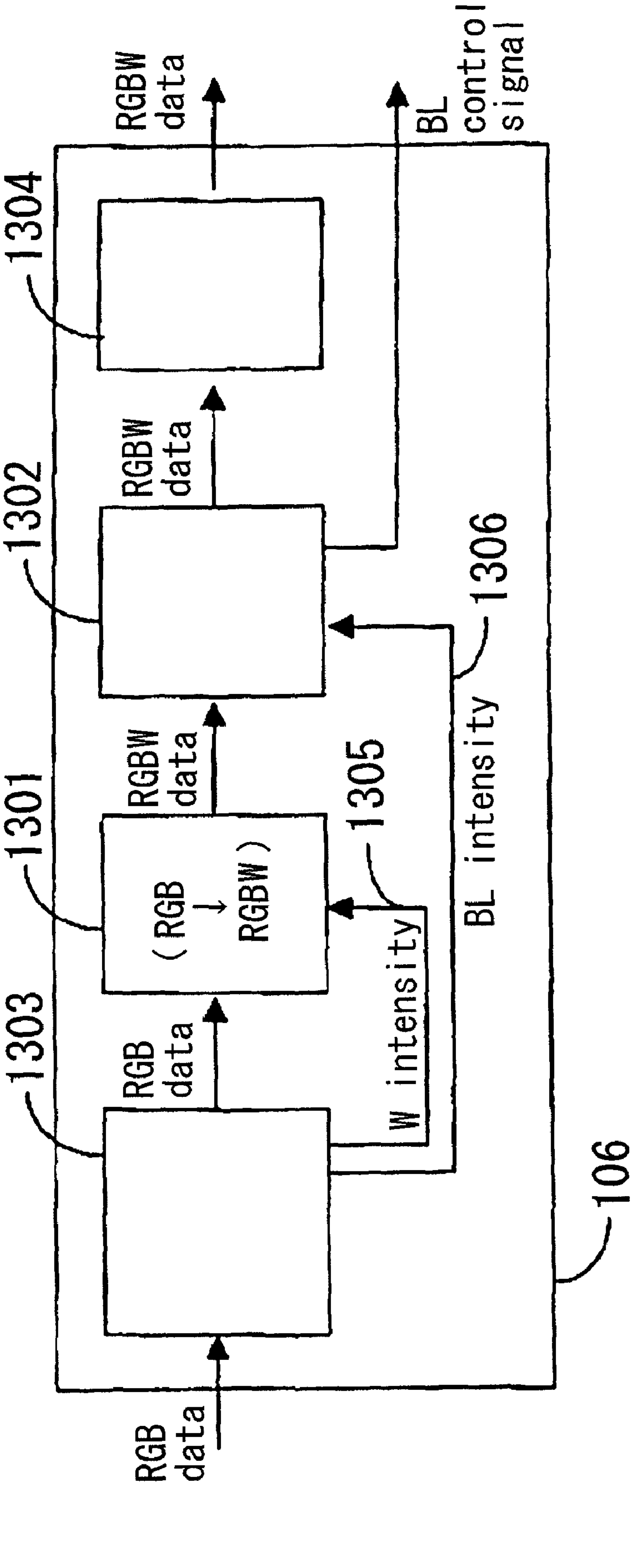
FIG. 12 is a diagram showing the configuration of a processing portion for conversion from RGB to RGBW in FIG. 1 according to the fourth embodiment.

FIG. 12 is a diagram showing the configuration of the processing portion for conversion from RGB to RGBW in FIG. 1 according to the fourth embodiment. The processing portion for conversion from RGB to RGBW 106 is formed of a conventional sub-pixel rendering circuit 1304, a W intensity calculating circuit 1303 which analyzes the saturation histogram from RGB pixels and calculates the W intensity, a W generating circuit 1301 which generates RGBW data on the basis of the W intensity calculated in the above described W intensity calculating portion (conversion from RGB to RGBW), and a low power backlight control circuit 1302 which lowers the level of backlight in accordance with the amount by which the RGBW data expands. In the fourth embodiment, the configuration of this processing portion for conversion from RGB to RGBW 106 is different from those in the first to third embodiments, and a low power backlight control portion is formed between the W generating portion (conversion from RGB to RGBW) 1301 and the sub-pixel rendering portion 1304.

Figure 13A:
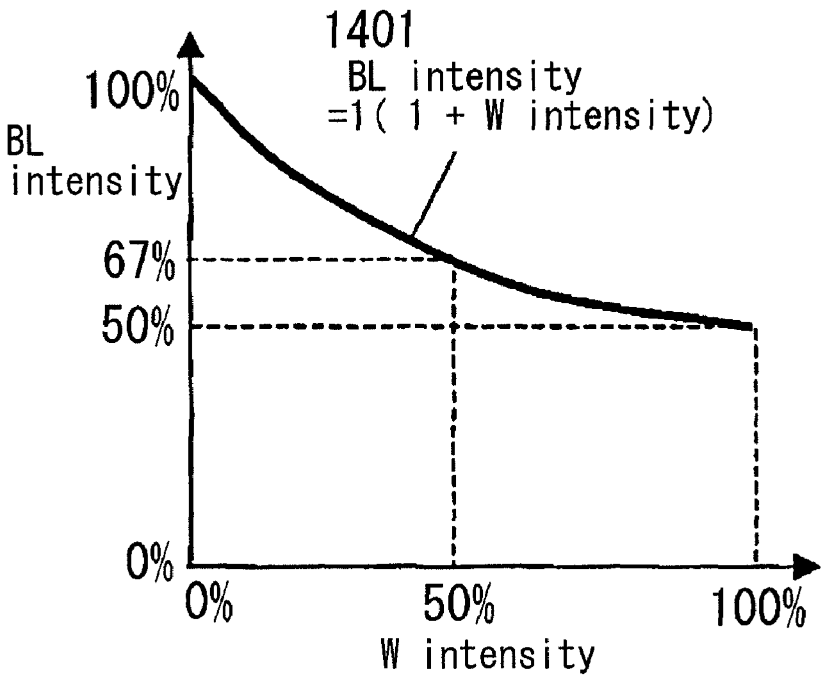
FIG. 13 is a graph for the explanation of a method for calculating the W intensity in the W intensity calculating circuit in FIG. 12.
Figure 13B:
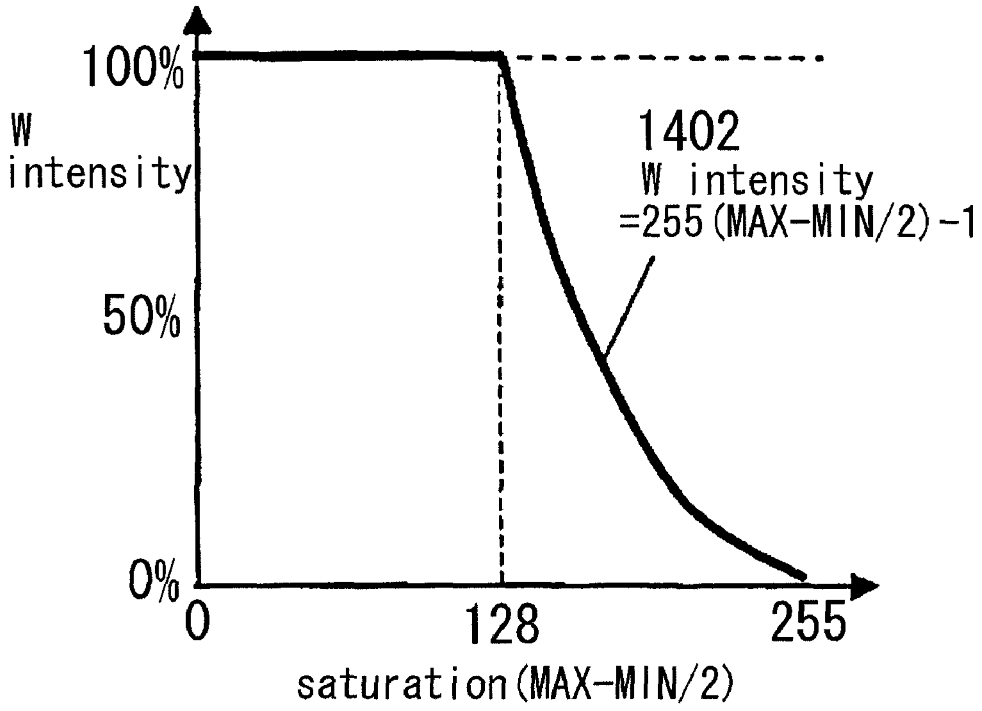

FIG. 13 is a graph for the explanation of a method for calculating the W intensity in the W intensity calculating circuit in FIG. 12. FIG. 13(A) shows the relationship between the W intensity and the BL intensity. The curved thick line in FIG. 13(A) indicates the values the BL intensity can take relative to the W intensity. The higher the W intensity is, the lower the BL power is; whereas in the case where the W intensity is low, the BL power is high in the relationship. Here, there is a relationship: BL intensity=1/(1 W intensity). In addition, in accordance with the method for calculating the W intensity, as shown in FIG. 13(B), a graph where the lateral axis indicates the saturation value (MAX−MIN/2) and the longitudinal axis indicates the W intensity, and the W intensity is determined in accordance with the above described saturation value. Here, the above described saturation data is determined through a histogram analysis. The reason why the saturation value is (MAX−MIN/2) is described below.

In the case where the input data for the W intensity calculating circuit is (R, G, B), the output data for the W generating circuit (conversion from RGB to RGBW) is (R', G', B', W), the pseudo-RGB data corresponding to the above described output data (R', G', B', W) is (R", G", B") and the W intensity is Wst (here, 0≦Wst frame integration 1), the following relational expression can be gained.

$$R''=R'+W \text{ (same for } G'' \text{ and } B'')$$

Here, the above is in the case where the γ properties are γ=1.

The brightness of the above described (R", G", B") is equal to the brightness gained by multiplying the brightness of the input data by (1+W intensity), and therefore:

$$R''=R'+W=(1+Wst)\times R \text{ (same for } G'' \text{ and } B'') \quad \text{(Formula 1)}$$

In addition, the following formula can be gained when the minimum value of (R, G, B) is MIN and the minimum value of (R', G', B') after the conversion to RGBW is MIN':

$$\text{MIN}'+W=(1+Wst)*\text{MIN}$$

Furthermore, judging from the results of the evaluation of the image quality, it is optimal for the W value to be equal to MIN'. Accordingly, the following Formula 2 can be gained:

$$\text{MIN}'+W=2W=(1+Wst)\times\text{MIN}$$

$$\therefore W=(1+Wst)\times\text{MIN}/2 \quad \text{(Formula 2)}$$

The following formula can be gained from Formulas 1 and 2:

$$R'=(1+Wst)\times(R-\text{MIN}/2)$$

Here, the maximum grade R' can take is 255, and therefore:

$$(1+Wst)\times(R-\text{MIN}/2)<255$$

$$\therefore Wst<255/(R-\text{MIN}/2)-1$$

The above described Wst becomes minimum in the case of R=MAX, and therefore:

$$Wst=255/(\text{MAX}-\text{MIN}/2)-1$$

$$\text{(Here, } 0\leqq Wst\leqq 1) \quad \text{(Formula 3)}$$

In addition, the following formula can be achieved when γ properties are taken into consideration:

$$\text{brightness value}=(\text{grade number}/255)\gamma$$

(Here, 0≦grade number≦255), and therefore the grade value (255, MAX, MIN) in the above (Formula 3) is converted to γ properties, and thus the following formula can be gained:

$$Wst=1/(\text{MAX}/255)\gamma-(\text{MIN}/255)\gamma/2)-1$$

$$\text{(Here, } 0\leqq Wst\leqq 1)$$

It can be seen from the above description that the W intensity (Wst) is calculated from (Formula 3) when the saturation value is (MAX−MIN/2).

Figure 14:
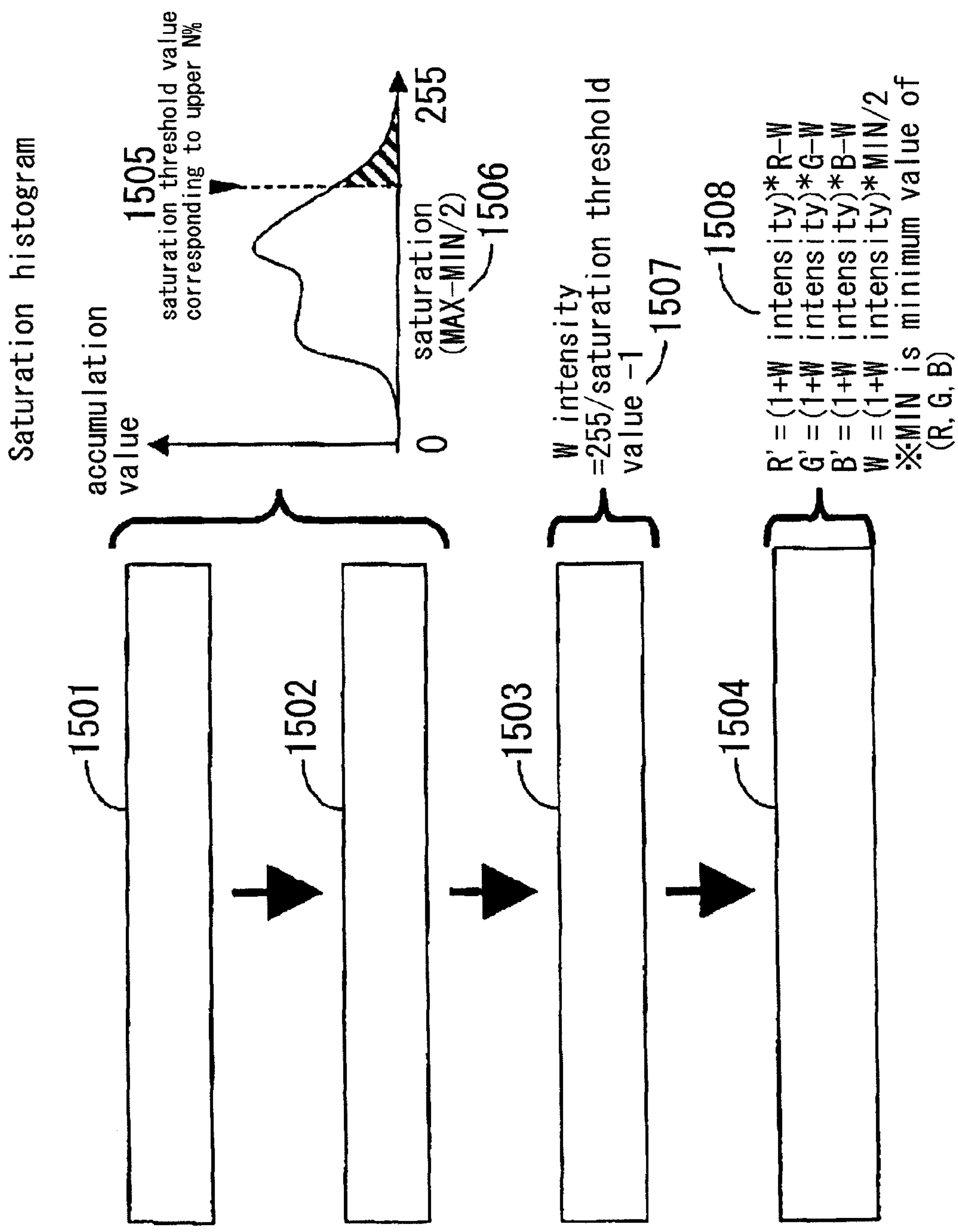
FIG. 14 is a diagram for illustrating the flows of the calculation of the W intensity and the conversion from RGB to RGBW.

Next, FIG. 14 is a diagram illustrating the flows of calculation of the W intensity and conversion from RGB to RGBW. In FIG. 14, (1) the saturation histogram is calculated . . . the accumulation value of the saturation (MAX−MIN/2) 1506 is calculated: 1501. Then, (2) the threshold value is calculated . . . the saturation threshold value 1505 corresponding to the upper N % is calculated from the accumulation value of the saturation (MAX−MIN/2): 1502. After that, (3) the W intensity is calculated . . . the W intensity 1507 is calculated from the saturation threshold value: 1503. Then, (4) RGB is converted to RGBW . . . RGBW is calculated from the RGB data using the calculated W intensity (Wst): 1504. This conversion formula is shown in FIG. 14 by the symbol 1508.

Figure 15:
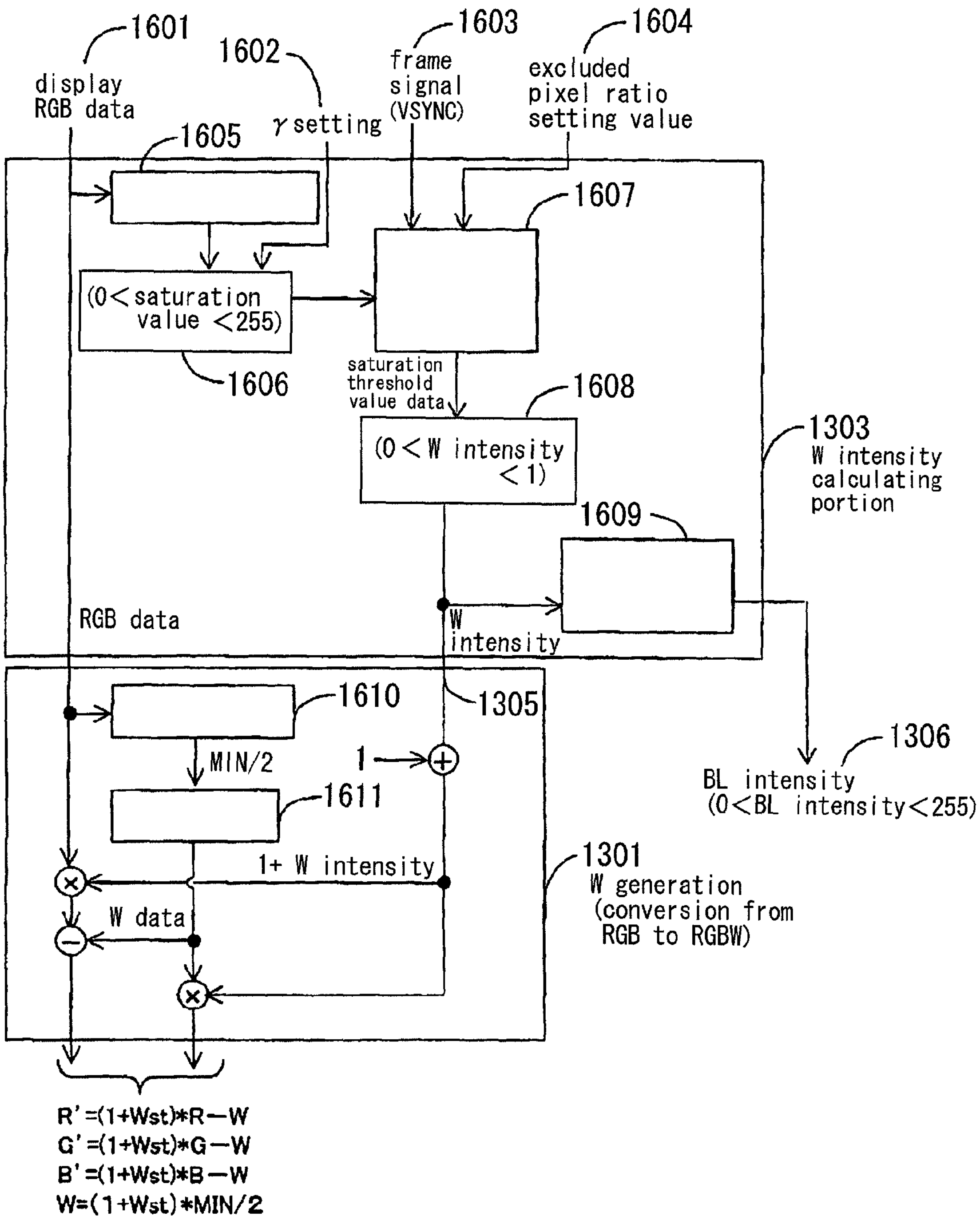
FIG. 15 is a block diagram for illustrating the configuration of the W intensity calculating portion and the W generating portion (portion for conversion from RGB to RGBW) according to the fourth embodiment.
Figure 16:
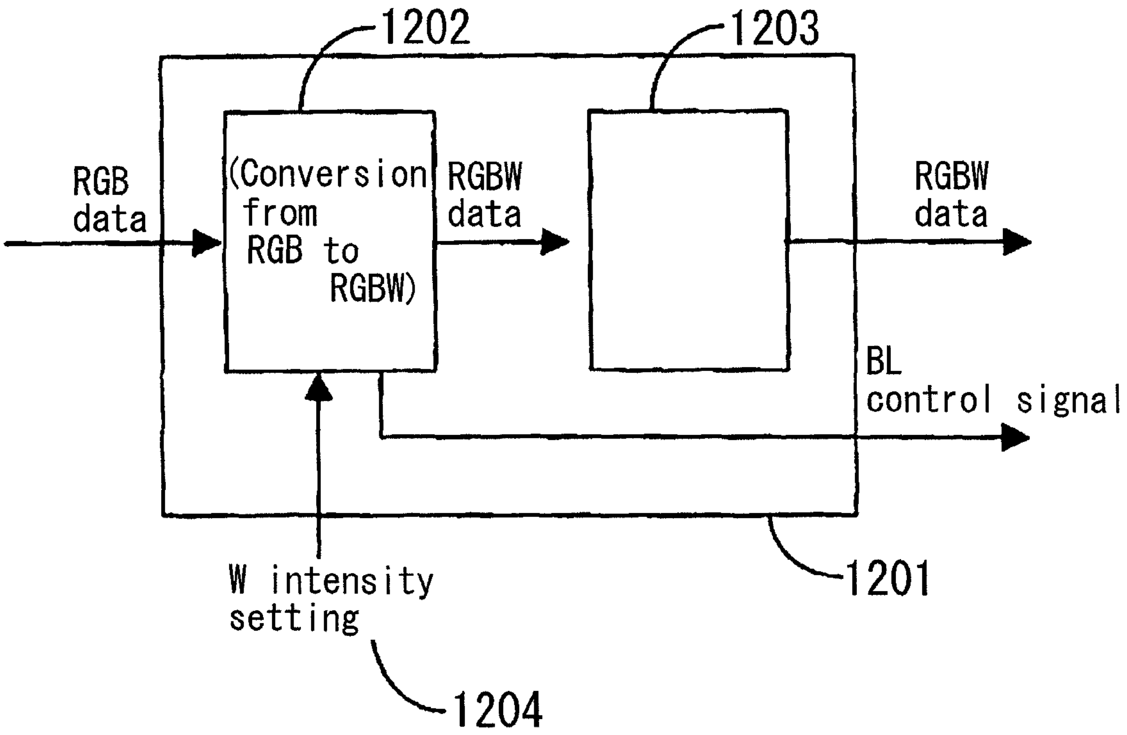
FIG. 16 is a diagram for illustrating the configuration of a conventional processing portion for the conversion from RGB to RGBW.

FIG. 15 is a block diagram showing the configuration for the implementation of the W intensity calculating portion and the W generating portion (portion for conversion from RGB to RGBW) according to the fourth embodiment. The W intensity calculating portion 1303 is formed of a maximum and minimum value calculating portion (0<saturation value<255) 1605, a saturation value calculating portion 1606, a saturation histogram counting portion 1607, a W intensity calculating portion (0<W intensity<1) 1608 and a 1/(1+W intensity) calculating portion 1609. In addition, the W generating portion 1301 is formed of a minimum value MIN calculating portion 1610 and a W data calculating portion 1611.

The conversion from RGB to RGBW and the BL intensity 1306 are gained from the configuration in FIG. 15. This BL intensity 1306 is supplied to the low power BL control portion 1302 so that the intensity of the backlight is controlled.

According to the present embodiment as well, the W intensity is lowered, and furthermore the backlight brightness is increased in images having high saturation, and thus the saturation and the brightness can be prevented from lowering when the backlight power is increased, and the deterioration in the image quality (darkness) due to a reduction in the brightness of a single color, which is a problem with the RGBW pixels, can be prevented. In addition, the saturation is little affected in an image having low saturation when the W intensity is increased, and therefore the brightness increases by setting the W intensity high. In this case, it is possible to reduce the backlight brightness in order to achieve the same level of brightness as in the prior art, and therefore, a reduction in the power can be achieved.

What is claimed is:

1. A display device, comprising:

a display panel having a number of data lines and a number of scanning lines which cross the data lines, wherein color pixels containing red (R), green (G), blue (B) and white (W) sub-pixels corresponding to intersections between said data lines and said scanning lines are aligned in a matrix; and a backlight which illuminates said display panel, characterized in that the display device has: a scanning driver which applies a horizontal scanning signal to said scanning lines; a data driver which outputs gradation voltages for the grades of said scanning lines to said data lines; and a processing apparatus which transmits RGB data to said data driver, said data driver has a conversion circuit which converts RGB data for one color pixel containing R sub-pixel data, G sub-pixel data and B sub-pixel data to RGBW data for one color pixel containing R sub-pixel data, G sub-pixel data, B sub-pixel data and W sub-pixel data, said conversion circuit has a W intensity setting circuit which is configured to change a ratio of the W intensity to a grade number of one RGB pixel, and the W intensity setting value for said W intensity setting circuit is determined in accordance with a ratio of the number of saturation pixels in the RGB data for each frame, said saturation pixels comprise pixels where the difference between the maximum value and the minimum value of the sub-pixel data for each piece of RGB data is greater than the set saturation threshold value (integer of 0 or greater), and the ratio of said number of saturation pixels is a ratio of the number of saturation pixels to the number of pixels within one frame from which black pixels where the maximum grade of the sub-pixels in each piece of RGB data is greater than the black threshold value (integer of 0 or greater) are excluded.

2. The display device according to claim 1, characterized in that the display device has a W intensity calculating circuit which calculates said W intensity setting value to be transmitted to said W intensity setting circuit, said W intensity calculating circuit is provided between the input data of said data driver and said conversion circuit, and said W intensity calculating circuit calculates a white grade ratio from the ratio of the minimum grade of the RGB data for each frame to the maximum grade, calculates an average value of the white grade ratio for each frame, and calculates the backlight brightness ratio on the basis of the average value of said white pixel ratio and said W intensity setting value.

3. The display device according to claim 2, characterized by having a control circuit which calculates the maximum grade of one pixel in the case where the RGBW data outputted from said conversion circuit is for said pixel, calculates the threshold grade corresponding to the upper N % of a histogram of the RGB data for each frame on the basis of said histogram (N % is a real number from 0% to 100%), sets the value gained by dividing the maximum grade value of the RGB data by said threshold grade as an expansion coefficient, expands the data so that the distribution of the RGB data in said histogram expands in the direction of the lateral axis by multiplying said RGBW data by said expansion coefficient, calculates a backlight brightness ratio by gaining a value of an inverse of said expansion coefficient to the power of the gamma value of the gamma properties of the display panel, and determines the backlight brightness through multiplication by the backlight brightness ratio calculated on the basis of the W intensity setting value.

4. The display device according to claim 2, characterized in that the average value of said white pixel ratio is calculated for pixels, excluding black pixels, where the maximum grade in the RGB data for each frame inputted into said data driver is greater than the black threshold value (integer of 0 or greater).

5. The display device according to claim 1, characterized in that said data driver comprises a register, and said saturation threshold value and said black threshold value are set in said register from the outside of said data driver.

6. A display device, comprising a display panel having a number of data lines and a number of scanning lines which cross the data lines, wherein color pixels containing red (R), green (G), blue (B) and white (W) sub-pixels corresponding to intersections between said data lines and said scanning lines are aligned in a matrix; and a backlight which illuminates said display panel, characterized in that the display device has: a scanning driver which applies a horizontal scanning signal to said scanning lines; a data driver which outputs gradation voltages for the grades of said scanning lines to said data lines; and a processing apparatus which transmits RGB data to said data driver, said data driver has a conversion circuit which converts RGB data for one color pixel containing R sub-pixel data, G sub-pixel data and B sub-pixel data to RGBW data for one color pixel containing R sub-pixel data, G sub-pixel data, B sub-pixel data and W data, said conversion circuit has a W intensity setting circuit which is configured to change a ratio of the W intensity to a grade number of one RGB pixel, and the W intensity setting value for said W intensity setting circuit is determined in accordance with a ratio of the number of saturation pixels in the RGB data for each frame and has a number of relational expressions for calculating the W intensity corresponding to the ratio of said number of saturation pixels, said saturation pixels comprise pixels where the difference between the maximum value and the minimum value of the sub-pixel data for each piece of RGB data is greater than the set saturation threshold value (integer of 0 or greater), and the ratio of said number of saturation pixels is a ratio of the number of saturation pixels to the number of pixels within one frame from which black pixels where the maximum grade of the sub-pixels in each piece of RGB data is greater than the black threshold value (integer of 0 or greater) are excluded.

7. The display device according to claim 6, characterized in that one of said number of relational expressions for calculating the W intensity corresponding to the ratio of said number of saturation pixels is for a still image or a moving image and another is for a computer graphic image or a user interface image.

8. The display device according to claim 6, characterized in that said data driver comprises a register, and said number of relational expressions for calculating the W intensity corresponding to the ratio of said number of saturation pixels are set in said register from the outside of said data driver.

9. A display device, comprising a display panel having a number of data lines and a number of scanning lines which cross the data lines, wherein color pixels containing red (R), green (G), blue (B) and white (W) sub-pixels corresponding to intersections between said data lines and said scanning lines are aligned in a matrix; and a backlight which illuminates said display panel, characterized in that the display device has: a scanning driver which applies a horizontal scanning signal to said scanning lines; a data driver which outputs gradation voltages for the grades of said scanning lines to said data lines; and a processing apparatus which transmits RGB data to said data driver, said data driver has a conversion circuit which converts RGB data for one color pixel containing R sub-pixel data, G sub-pixel data and B sub-pixel data to RGBW data for one color pixel containing R sub-pixel data, G sub-pixel data, B sub-pixel data and W sub-pixel data, said conversion circuit has a W intensity setting circuit which is configured to change a ratio of the W intensity to a grade number of one RGB pixel, the W intensity setting value for said W intensity setting circuit is determined in accordance with the ratio of the number of saturation pixels in the RGB data for each frame and has a number of relational expressions for calculating the W intensity corresponding to the ratio of said number of saturation pixels, and in accordance with a method for determining said number of relational expressions, the RGB data for each frame is divided into X regions (X is a natural number of 1 or higher), and the ratio of the number of saturation pixels where the difference between the maximum value and the minimum value in the sub-pixel data for each piece of RGB data is no less than the set saturation threshold value (integer of 0 or higher) to the white pixels where each piece of RGB data is no less than the set white threshold value (integer of 0 or higher) is determined in each of said X regions.

10. The display device according to claim 9, characterized in that one of the number of relational expressions for calculating the W intensity corresponding to the ratio of said saturation pixels is for a still image or a moving image and another is for a computer graphic image or a user interface image, and the conditions for switching from said relational expression for a still image or a moving image to said computer graphic image and user interface image are that where the ratio of said number of saturation pixels is no less than the saturation ratio threshold value (real number from 0 to 1) and the ratio of said white pixels is no less than the white ratio threshold value (real number from 0 to 1) within at least one of said regions.

11. The display device according to claim 9, characterized in that said driver comprises a register, and said X regions, said saturation threshold value, said white threshold value, said saturation ratio threshold value and said white ratio threshold value are set in said register from the outside of said data driver.

12. The display device according to claim 4, characterized in that said data driver comprises a register, and said saturation threshold value and said black threshold value are set in said register from the outside of said data driver.

13. The display device according to claim 7, characterized in that said data driver comprises a register, and said number of relational expressions for calculating the W intensity corresponding to the ratio of said number of saturation pixels are set in said register from the outside of said data driver.

14. The display device according to claim 10, characterized in that said driver comprises a register, and said X regions, said saturation threshold value, said white threshold value, said saturation ratio threshold value and said white ratio threshold value are set in said register from the outside of said data driver.

* * * * *